United States Patent [19]
Brown, Jr.

[11] 3,953,094
[45] Apr. 27, 1976

[54] CABINET CONFIGURATION FOR LOADING DISC DRIVE APPARATUS

[75] Inventor: Leon Henry Brown, Jr., Sylmar, Calif.

[73] Assignee: Wangco Incorporated, Los Angeles, Calif.

[22] Filed: Nov. 30, 1973

[21] Appl. No.: 420,663

[52] U.S. Cl. ............................. 312/303; 292/336.3; 312/222; 312/320; 312/333
[51] Int. Cl.² .................. A47B 88/00; A47B 96/00; E05B 3/00; E05C 3/16
[58] Field of Search ........... 312/294, 295, 319, 322, 312/323, 303, 21, 27–29, 215, 222, 220, 270

[56] References Cited
UNITED STATES PATENTS

| | | | |
|---|---|---|---|
| 1,939,487 | 12/1933 | Brainard | 312/303 |
| 2,510,807 | 6/1950 | Fosberg | 312/273 |
| 2,890,090 | 6/1959 | Olson | 312/319 |
| 3,033,637 | 5/1962 | VanDonk et al. | 312/303 |
| 3,252,746 | 5/1966 | Kafferlin et al. | 312/333 X |
| 3,851,941 | 12/1974 | Stebe | 312/333 |

*Primary Examiner*—Paul R. Gilliam
*Assistant Examiner*—Carl F. Pietruszka
*Attorney, Agent, or Firm*—Henry M. Bissell

[57] ABSTRACT

Apparatus for receiving and driving magnetic disc cartridges as peripheral computer memory units. Particular mechanisms are included which render the apparatus more effective and more compact than previously known corresponding devices of a comparable nature. These mechanisms cooperate to provide means for permitting the apparatus to be withdrawn partially from its mounting rack and for moving an interfering panel member out of the way to permit loading and unloading of the disc cartridge from the top of the apparatus. The mechanisms include releasable latching means and a solenoid controlled lock for preventing release of the latching means except under predetermined positions, plus means for pivoting a lid member to avoid interference with adjacent equipment.

8 Claims, 5 Drawing Figures

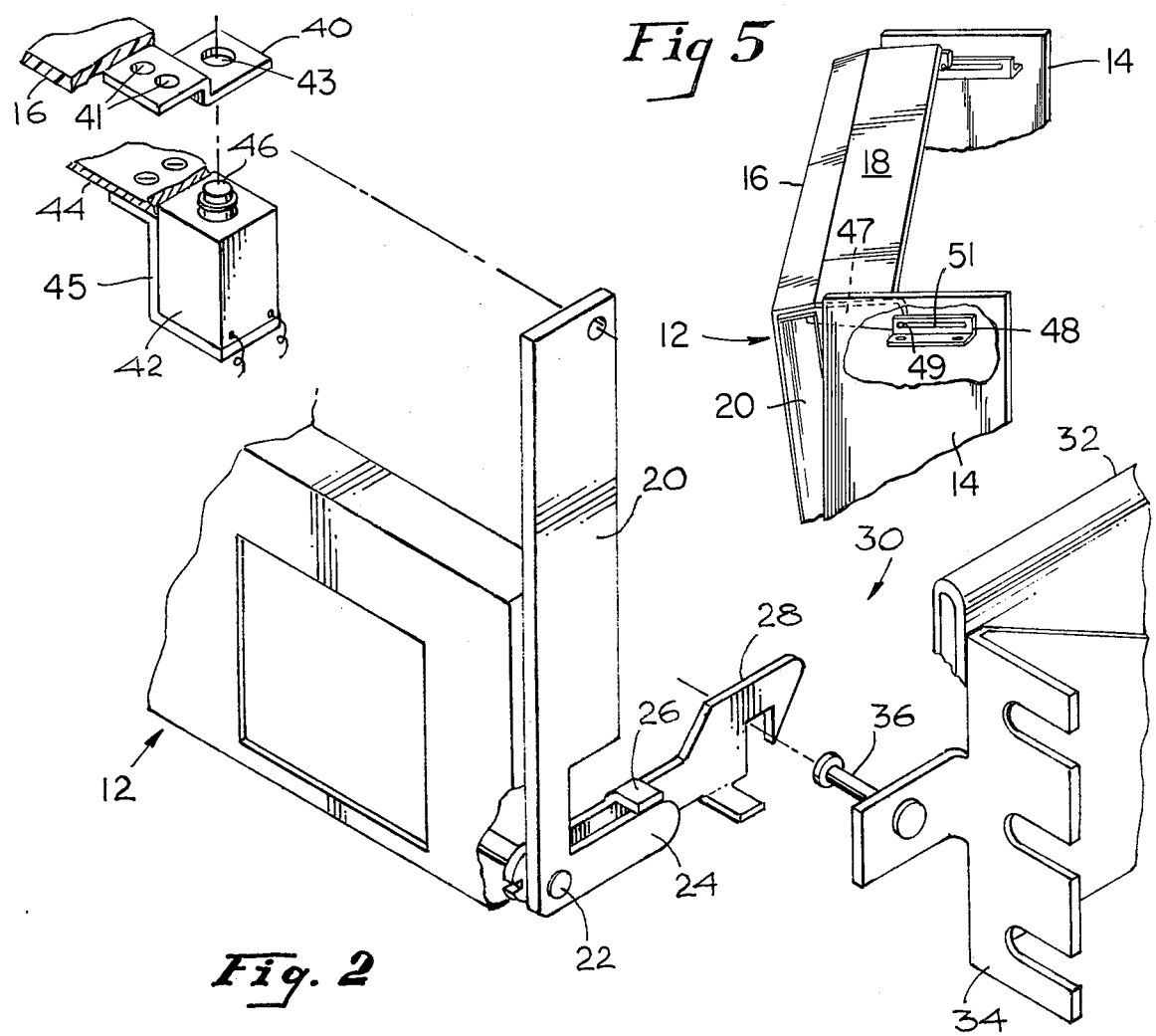
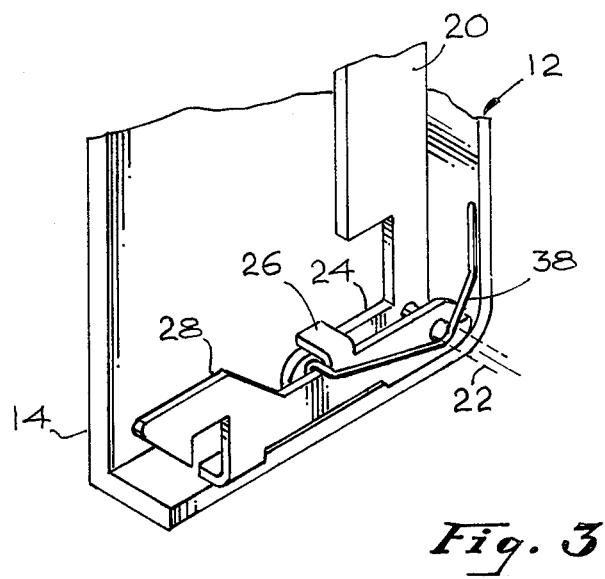

3,953,094

CABINET CONFIGURATION FOR LOADING DISC DRIVE APPARATUS

BACKGROUND OF THE INVENTION

1. Field of the Invention

This invention relates to apparatus for driving disc memory devices, and, more particularly, to apparatus for driving magnetic cartridges of a particular type for use as peripheral computer data storage.

2. Description of the Prior Art

The particular type of disc cartridge which apparatus embodying the present invention is designed to operate with is the IBM 5440 type. This cartridge is designed for loading into the apparatus from the top. Various vendors other than IBM manufacture and sell disc drive apparatus for use with this type of cartridge. The cartridge is a standard size and shape, and certain of the components within the disc drive apparatus are standard or at least present certain minimum dimensions insofar as their size and spatial relationship to the cartridge inserted in the disc drive apparatus are concerned. Thus, there are certain minimum dimensions for the disc drive apparatus which are more or less standard throughout the industry. However, rack space is at a premium in equipment mounting one or more disc drive units and, where a particular design can be achieved which significantly reduces the rack space required for a disc drive apparatus, an important benefit may be achieved.

The combination of equipment which is required to be mounted in the disc drive apparatus in line with the space reserved to receive the standard disc cartridge requires a front-to-back dimension of 24 inches. The maximum chassis dimension which can be accommodated in a standard 24-inch rack is approximately 22 inches. In those prior art disc drive apparatus of the top loading type which are known, this minimum chassis dimension of 24 inches is accommodated by utilizing a mounting rack of the next larger standard size which is substantially in excess of the minimum front-to-back chassis dimension. This requires mounting racks which are both more expensive in initial cost and wasteful of space, since additional depth is required. This additional depth is needed for the disc drive apparatus, although there may be no other component in the rack that calls for the increased depth, and thus there is actual waste of some space throughout the rack in those portions which mount equipment other than the disc drive apparatus.

SUMMARY OF THE INVENTION

In brief, the present invention provides a particular construction for a disc drive apparatus of the top loading type which incorporates an enclosed extension at the front portion of the apparatus so that only a part of the apparatus is enclosed within the mounting rack, when the apparatus is mounted therein. Thus, the apparatus embodying the present invention may be mounted in racks having smaller front-to-back dimensions, thereby obviating the need for utilizing the deeper racks which are required by other known apparatus of this type.

In accordance with an aspect of the invention, the enclosed forward portion of equipment embodying the invention is pivotably mounted so that it may be partially opened outwardly about a transverse pivot axis extending along its lower forward edge. This is desirable in order to permit clearance for loading and unloading the disc cartridge, since the upper part of the partial enclosure interferes with such loading and unloading when the partial enclosure is in the closed position. This upper part of the partial enclosure also pivots relative to the remainder of the enclosure as the latter is opened so as to avoid interference with other equipment in the next rack level. Opening of the partial enclosure is combined with an arrangement for releasing a latch that normally serves to prevent the disc drive apparatus from being slid outwardly on mounting tracks to provide access to the disc cartridge portion of the apparatus. In this combination, a locking member is incorporated to prevent the opening of the forward enclosure so that the unit cannot be opened while the disc is rotating or under certain other conditions. This lock is controlled by an associated solenoid to permit release of the lock under allowable conditions.

BRIEF DESCRIPTION OF THE DRAWING

A better understanding of the present invention may be had from a consideration of the following detailed description, taken in conjunction with the accompanying drawing, in which:

FIG. 2 is an exploded isometric view, partially broken away, of a particular portion of the apparatus of FIG. 1, taken along the lines 2—2;

FIG. 3 is a view of a portion of the apparatus of FIG. 1, taken along the lines 3—3 and looking in the direction of the arrows;

FIG. 5 is a fragmentary view showing the forward enclosed portion in the open position.

DESCRIPTION OF THE PREFERRED EMBODIMENT

Figure 1:
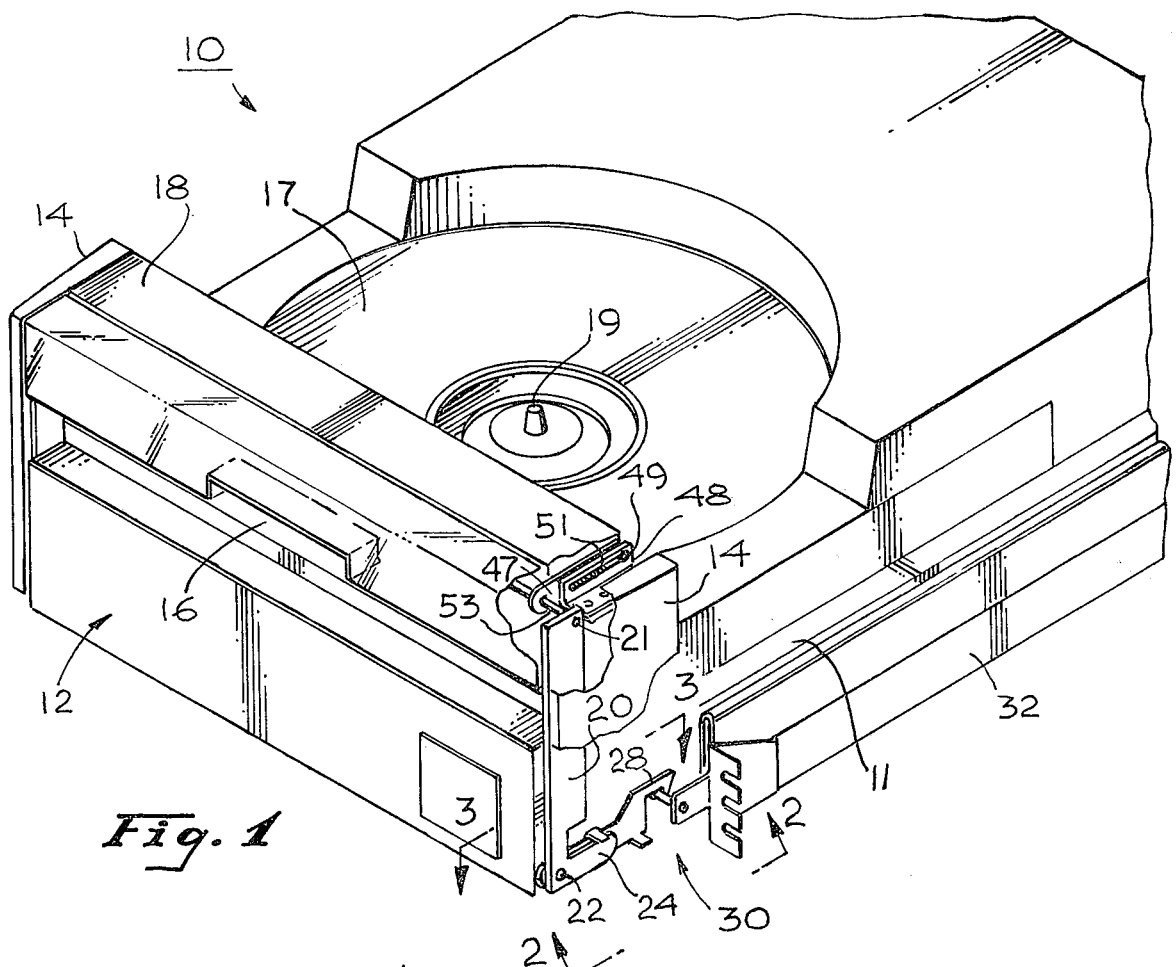
FIG. 1 is a front quarter isometric view of particular disc drive apparatus in accordance with the present invention with portions broken away to show certain details.

In the drawing there is shown a particular disc drive apparatus 10 of the top loading type in accordance with the present invention. The apparatus 10 is shown comprising a chassis 11 supporting a front panel member 12 having a handle 16 and a lid 18 extending between side brackets 20. The front panel member 12 and brackets 20 are fastened together by screws (not shown) while the lid 18 is supported by a pivot and slide arrangement to be described hereinbelow. End plates 14 are affixed by internal fasteners such as screws (not shown) to the chassis 11 which also provides a pivotable mounting for the front panel member 12 about a transverse axis extending between pivot pins 22 of the respective side brackets 20. The chassis 11 includes a housing 15 and is also shown including a space 17 for a disc cartridge which may be loaded upon and driven by a drive spindle 19. It will be noted that the lid 18 overlaps a portion of the cartridge space 17 when the front panel member 12 is closed.

As indicated in FIGS. 1 and 2, the side bracket 20 is provided with a rearwardly extending lower leg portion 24 which is adjacent to and under an overlapping tab 26 of an associated latch member 28. The latch member 28 is part of a latching mechanism 30, one on each side, which serves to retain the disc drive apparatus 10 within the mounting rack until the latch member 28 is released. The apparatus 10 is supported on sliding tracks 32, one set on each side, of conventional construction for drawer slide and support apparatus so that it may be withdrawn from the cabinet or rack in which it is mounted. Ready withdrawal along these sliding tracks 32 is necessary in order to permit loading and unloading of the disc cartridge within the unit. The forward end of the fixed track 32 includes a bracket 34 having a locking pin 36 affixed thereto in a position to be engaged by the latch member 28. When the unit is pushed back into the cabinet or mounting rack and the front panel member 12 moves to the closed position a wire spring 38 (FIG. 3) extending between the latch member 28 and a portion of the front panel member 12 biases the latch member 28 to its closed or pinretaining position. As the unit is moved into the cabinet, the forward, ramped end of the latch member 28 contacts and rides up over the latch pin 36 until the unit is in closed position, at which time the latch member 28 extends down over and engages the latching pin 36.

As particularly shown in FIG. 2, a locking bracket 40 having screw holes 41 and a pin-receiving aperture 43 is mounted interiorly on the underside of the bottom of the recessed handle 16 of the front panel member 12. Adjacent to the locking bracket 40 and in a position to establish locking engagement therewith is a solenoid 42 which is mounted on a support bracket 45 attached to a frame cross member 44 on the front of the chassis 11. The solenoid 42 includes a retractable pin 46 and suitable electrical wires (not shown). The pin 46 normally extends through the opening of the locking bracket 40 when the front panel member 12 is closed and the apparatus is operating. Under these circumstances, the front panel member 12 cannot be pivoted forward about its pivot axis 22 and thus cannot release the latching mechanism 30. This is the condition of the locking mechanism when the apparatus 10 is operating to drive a contained disc and under certain other conditions. When none of these inhibiting conditions apply, the solenoid 42 may be energized to retract the pin 46 from engagement with the locking bracket 40. When power is turned on and the mode select switch (not shown) is in the "load" position, the solenoid 42 is energized so as to release the front panel member 12. The front panel member 12 may then be pivoted forwardly to the open position, which automatically raises the latch member 28 to release the latching mechanism 30 so that the disc drive apparatus 10 may be slid forward out of its cabinet to a position at which the disc cartridge may be loaded or unloaded. Not only is the apparatus extended outwardly of the rack enclosure to a position where the disc cartridge portion is clear of the rack, but the front panel member 12 is pivoted forward to a position where the lid portion 18 thereof clears the disc cartridge section. After loading, the mode select switch is turned to the "drive" position, which de-energizes the solenoid 42 so that the pin 46 extends into engagement with the locking bracket 40, thus preventing the front panel member 12 from being opened inadvertently. Energization cannot be restored to the solenoid 42 until a predetermined time (approximately 30 seconds) after the mode select switch is returned to the "load" position in order to give the drive mechanism time to stop the rotation of the disc.

The lid 18 of the panel member 12 is pivotably attached to the side brackets 20 and arranged so that it maintains its normal horizontal attitude as the panel member 12 is pivoted open to its forward position. This is accomplished by means of a support bracket 47 fastened to the end of the lid 18, a fixed bracket 48 fastened to the chassis cover 15 of the apparatus 10, and a guide pin 49 mounted on the support bracket 47 and extending through a horizontally aligned guide slot 51 in the fixed bracket 48. A pivot rod 53 is also provided for the lid 18 for engaging the upper portion of the side bracket 20 so as to permit the lid 18 to pivot about the rod 53. As the panel member 12 is pivoted forward (outwardly), the lid 18 travels forward with it but the pin 49 moving in the guide slot 51 of the fixed bracket 48 serves to guide the inner or rearward edge of the lid 18 as the forward edge rotates about the pivot rod 53, thus preventing the inner edge of the lid 18 from rising above its initial level. This is sometimes necessary in order to prevent the lid 18 from extending above the allotted mounting space of the cabinet or mounting rack assembly as the front panel enclosure is pivoted open.

Figure 4:
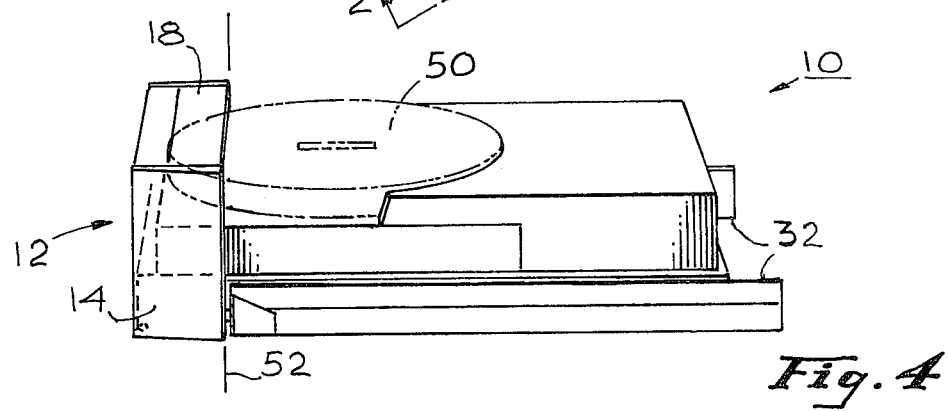
FIG. 4 is a side view showing the forward enclosed portion in the closed position.

FIG. 4 illustrates the disc drive apparatus 10 in a position as though it were mounted in a cabinet or rack assembly with a disc cartridge 50 loaded thereon. The line 52 indicates the termination of the cabinet or rack assembly in which the apparatus 10 is mounted and it will be noted that the apparatus 10 extends forwardly of the line 52 by approximately 3½ inches. It is this forward projection of the apparatus 10 enclosed by the end caps 14 and the front panel member 12 which permits the use of a shallower cabinet or rack assembly than is possible with other disc drive apparatus which are known. However, it may be seen in FIG. 4 that the lid 18 of the panel member 12 extends over the forward portion of the cartridge 50, thus preventing it when in that attitude from being loaded or unloaded in the apparatus 10.

FIG. 5 shows the panel member 12 pivoted forwarded so that the lid 18 clears the cartridge 50. For clarity, the chassis is not shown, though it is to be understood that the brackets 48 are affixed to the chassis, as mentioned earlier herein.

Although there have been described above specific arrangements of a top loading disc apparatus in accordance with the invention for the purpose of illustrating the manner in which the invention may be used to advantage, it will be appreciated that the invention is not limited thereof. Accordingly, any and all modifications, variations or equivalent arrangements which may occur to those skilled in the art should be considered to be within the scope of the invention as defined in the appended claims.

What is claimed is:

1. In disc drive apparatus adapted for receiving a standard disc cartridge of the top loading type, the combination comprising:

a chassis portion of said apparatus having a disc cartridge space partially extending forward beyond the limit of an associated enclosure;

a front enclosure disposed to enclose said extended chassis portion, said front enclosure comprising a pivotable front panel member, a lid member coupled to the front panel member, the lid member extending in a horizontal plane over a portion of the space in which the disc cartridge may be mounted;

means mounting the front panel member to said chassis for pivoting about an axis along its lower forward edge to permit the front panel and lid members to pivot forwardly about said axis so as to clear the disc cartridge space; and means for substantially preventing said lid member from moving above said horizontal plane as said front panel is pivoted forwardly, means for releasably latching the front enclosure and the chassis in the closed position.

2. Apparatus in accordance with claim 1 wherein the chassis latching means includes means operably connected to said front panel member for releasing said chassis latching mechanism when said front panel member is pivoted outwardly.

3. Apparatus in accordance with claim 2 wherein the chassis latching means comprises a pin extending laterally from a fixed portion of the apparatus, and a spring-biased, latch member having an inclined surface for riding over the latch pin during closure of the chassis and front enclosure and a retention portion for retaining the latch pin when the latching means are engaged.

4. Apparatus in accordance with claim 3 wherein the latch member includes an extended tab for engaging a portion of the front panel member and releasing the chassis latching means as said panel member is pivoted forward.

5. Apparatus in accordance with claim 4 further including a wire lever spring mounted on the latch member and bearing against the front panel member for urging the latch member to engage the latch pin when the front panel member is in the closed position.

6. Apparatus in accordance with claim 1 and including locking means for preventing the front panel member from being pivoted forwardly.

7. Apparatus in accordance with claim 6 wherein said locking means comprises a locking bracket mounted on said panel member, and a selectively energizable solenoid mounted on the chassis and having a retractable pin for engaging the locking bracket.

8. Apparatus in accordance with claim 1 wherein said means for substantially preventing said lid member from moving above said horizontal plane includes means for pivotably mounting the lid member to the front panel member, a fixed bracket mounted to the chassis and having a horizontal guide slot therein, and a guide pin extending from a rearward portion of the lid member to engage the guide slot to cause the lid member to pivot relative to the front panel member during opening and closing of the front panel member.

* * * * *